(12) United States Patent
Johnson et al.

(10) Patent No.: US 10,628,015 B2
(45) Date of Patent: Apr. 21, 2020

(54) GEO-TEMPORAL INCIDENT NAVIGATION WITH INTEGRATED DYNAMIC CREDIBILITY ASSESSMENT

(71) Applicant: MOTOROLA SOLUTIONS, INC., Chicago, IL (US)

(72) Inventors: Eric Johnson, Chicago, IL (US); Zheng Fang, Chicago, IL (US); Yang Luo, Chicago, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/847,644

(22) Filed: Dec. 19, 2017

(65) Prior Publication Data

US 2019/0187882 A1 Jun. 20, 2019

(51) Int. Cl.
*G06F 3/048* (2013.01)
*G06F 3/0484* (2013.01)
(Continued)

(52) U.S. Cl.
CPC .... *G06F 3/04845* (2013.01); *G06F 16/90335* (2019.01); *G06Q 50/26* (2013.01)

(58) Field of Classification Search
CPC .. G06F 19/322; G06F 19/3418; G06F 19/323; G06F 17/30864; G06F 3/0482; G06F 17/30554; G06F 17/30958; G06F 17/30994; G06F 17/30705; G06F 3/04817; G06F 17/30513; G06F 17/3053; G06F 17/3089; G06F 17/30961; G06F 3/0418; G06F 3/044; G06F 3/047; G06F 11/0748; G06F 11/079; G06F 11/3055;
(Continued)

(56) References Cited

U.S. PATENT DOCUMENTS 5,808,615 A 9/1998 Hill et al.
6,907,430 B2 6/2005 Chong et al.
(Continued)

OTHER PUBLICATIONS

Geotime, "Poweful Presentations for Investigative Results," website (2017) 5 pages, https://geotime.com/.
(Continued)

*Primary Examiner* — Di Xiao
(74) *Attorney, Agent, or Firm* — Michael Best & Friedrich LLP (57) ABSTRACT

Systems and methods for geo-temporal incident navigation. In one method, a graphical user interface (GUI) is generated. The GUI includes a primary window and a secondary window. The primary window includes a peripheral edge, a map, and an incident location indicator overlaid on the map. The secondary window includes an identifier for the incident, a plurality of outcome nodes, corresponding to potential outcomes for the incident, based on a plurality of nodes related to the incident, and a plurality of outcome credibility scores corresponding to the outcome nodes. A graphical control positioned at the peripheral edge of the primary window includes an incident indicator positioned along a timeline. The plurality of outcome nodes is selected and the plurality of credibility scores is computed based on a position of the incident indicator on the timeline. An electronic processor controls a display to present the graphical user interface.

20 Claims, 7 Drawing Sheets

(51) Int. Cl.
*G06Q 50/26* (2012.01)
*G06F 16/903* (2019.01)

(58) Field of Classification Search
CPC ............ G06F 11/327; G06F 17/30731; G06F 19/321; G06F 1/12; G06F 21/36; G06F 3/04842; G06F 3/04886; G06F 8/34; G06F 9/50; G06F 11/00; G06F 3/04845; G06F 16/90335
See application file for complete search history.

(56) References Cited

U.S. PATENT DOCUMENTS

| | | | | |
|---|---|---|---|---|
| 7,194,395 | B2 * | 3/2007 | Genovese | G06Q 10/00 700/83 |
| 8,924,872 | B1 * | 12/2014 | Bogomolov | H04W 4/90 715/764 |
| 8,949,164 | B1 * | 2/2015 | Mohler | G06N 7/005 706/46 |
| 2002/0198866 | A1 | 12/2002 | Kraft et al. | |
| 2003/0174165 | A1 | 9/2003 | Barney | |
| 2009/0100030 | A1 * | 4/2009 | Isakson | G06F 16/436 |
| 2009/0276233 | A1 | 11/2009 | Brimhall et al. | |
| 2018/0101970 | A1 * | 4/2018 | Waniguchi | G06N 7/00 |

OTHER PUBLICATIONS

Eschat, "The Leader in Public Safety Push-to-Talk," website (2017) 3 pages, http://www.eschat.com/.

GB1818996.9 Abbreviated Examination Report dated Apr. 29, 2019 (5 pages).

United Kingdom Intellectual Property Office Examination Report under Section 18(3) dated Mar. 6, 2020 for related GB Application No. GB1818996.9 (7 pages).

* cited by examiner

GEO-TEMPORAL INCIDENT NAVIGATION WITH INTEGRATED DYNAMIC CREDIBILITY ASSESSMENT

BACKGROUND OF THE INVENTION

Law enforcement and other public safety personnel respond to incidents in the course of their duties. Responding to incidents often involves collecting myriad pieces of information (for example, police reports, evidence, witness reports, video and other media assets, and the like) related to the incident response. This produces large document collections. These collections are navigated by personnel during the occurrence of an incident and in subsequent investigations or incident reconstruction. To guide incident response or crime investigation, it can be critical to know when, where, and by whom particular pieces of information concerning an incident have been collected.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, law enforcement and other public safety personnel responding to or investigating incidents gather large amounts of media, documentation, and other data pertaining to the incidents. Responding personnel also produce reports, and gather or data relating to the incident from government and other sources. Metadata describing the data (for example, where, when, and by whom the data was collected, data type, and the like) is also generated. Also included in the collected data are relationships between the data. Such data (nodes) and relationships (edges) are often used in knowledge and link analysis graphs to assist personnel in resolving an incident (for example, capturing a suspect, solving a crime, or locating a missing person or stolen object).

The data and relationships generated during an incident response may point to an outcome or outcomes for the incident (for example, which suspect committed a particular crime). However, manually navigating large amounts of data and relationships is a difficult and time consuming process. Furthermore, the credibility of a particular potential outcome, on the basis of its relationships to the non-outcome nodes which the outcome node depends, may be difficult to establish using current systems. Presenting large amounts of data without credibility assessments causes users of such systems to manually search and filter the data, increasing the usage of computer, database, and network resources. Accordingly, systems and methods are provided herein for, among other things, a geo-temporal incident navigation system with dynamic credibility assessment tools.

Embodiments presented herein gather data related to incidents and process to the data to determine relationships among the data to create knowledge graphs. Clusters are created from the knowledge graphs, and are used to generate and update credibility scores (for example, using a Bayesian inference network) for each data source as well as the incident outcomes, which depend on the data. Embodiments presented herein provide a graphical user interface to track incidents in time and space, and allow users to navigate spatially and temporally through one or more incidents. Tactical support or crime analysis personnel can use such embodiments to interactively visualize and navigate media and other data associated with the incident to assist in real-time incident response or post-incident investigation. Presenting data with the credibility assessments increases the efficiency of the system by allowing users to better focus their use of the system. This reduces the need for repeated database searches, thereby reducing processor load and network traffic. Furthermore, understanding the credibility associated with each potential outcome allows agencies to better focus resources and resolve incidents more efficiently than current methods.

One example embodiment provides a geo-temporal incident navigation system. The system includes a database, a display, and an electronic processor communicatively coupled to the database and the display. The electronic processor is configured to receive a user input corresponding to an incident. The electronic processor is configured to retrieve, from the database, a plurality of nodes related to the incident. The electronic processor is configured to generate a graphical user interface. The graphical user interface includes a primary window including a peripheral edge, a map, and an incident location indicator overlaid on the map, the incident location indicator associated with a location for the incident. The graphical user interface includes a secondary window including an identifier for the incident, a plurality of outcome nodes for the incident based on the plurality of nodes, each outcome node corresponding to a potential outcome for the incident, and a plurality of outcome credibility scores, each corresponding to one of the plurality of outcome nodes. The graphical user interface includes a graphical control including an incident indicator positioned along a timeline, the graphical control positioned at the peripheral edge of the primary window. The incident indicator is associated with the identifier for the incident. The plurality of outcome nodes is selected based on a position of the incident indicator on the timeline. The plurality of credibility scores is computed based on a position of the incident indicator on the timeline. The electronic processor is configured to control the display to present the graphical user interface.

Another example embodiment provides a method for geo-temporal incident navigation. The method includes receiving, with an electronic processor, a user input corresponding to an incident. The method includes retrieving, from a database communicatively coupled to the electronic processor, a plurality of nodes related to the incident. The method includes generating, with the electronic processor, a graphical user interface. The graphical user interface includes a primary window including a peripheral edge, a map, and an incident location indicator overlaid on the map, the incident location indicator associated with a location for the incident. The graphical user interface includes a secondary window including an identifier for the incident, a plurality of outcome nodes for the incident based on the plurality of nodes, each outcome node corresponding to a potential outcome for the incident, and a plurality of outcome credibility scores, each corresponding to one of the plurality of outcome nodes. The graphical user interface includes a graphical control including an incident indicator associated with the identifier for the incident and positioned along a timeline, the graphical control positioned at the peripheral edge of the primary window. The plurality of outcome nodes is selected based on a position of the incident indicator on the timeline. The plurality of credibility scores is computed based on a position of the incident indicator on the timeline. The method includes controlling, with the electronic processor, a display to present the graphical user interface.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
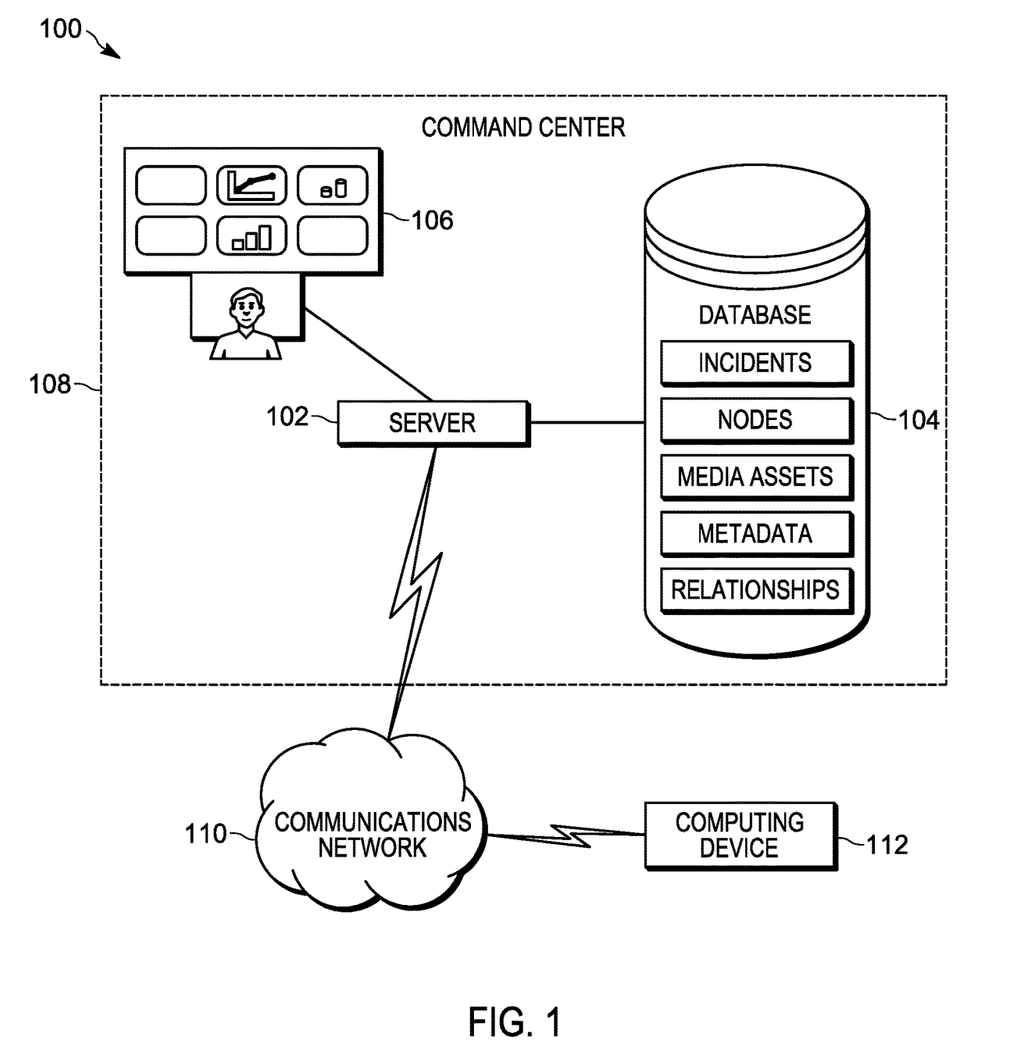
FIG. 1 is a diagram of a geo-temporal incident navigation system in accordance with some embodiments.
Figure 2:
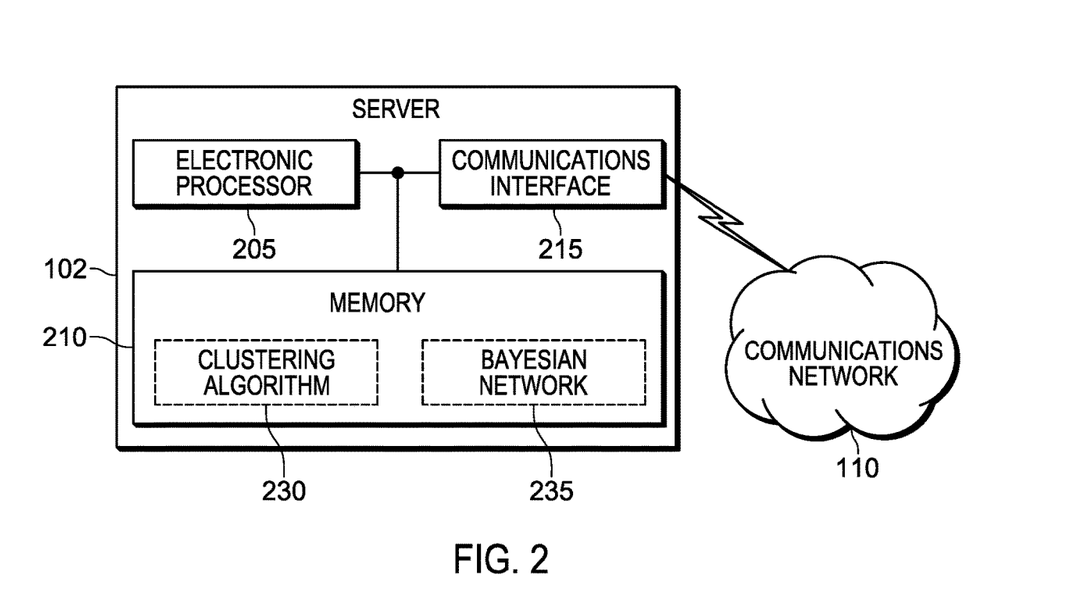
FIG. 2 is a diagram of a server of the system of FIG. 1 in accordance with some embodiments.

FIG. 1 illustrates an example geo-temporal incident navigation system 100. In the example illustrated, the system 100 includes a server 102, a database 104, and a display 106. The server 102, described more particularly below with respect to FIG. 2, is communicatively coupled to, and writes data to and from, the database 104. As illustrated in FIG. 1, the database 104 is a database housed on one or more suitable database servers communicatively coupled to and accessible by the server 102. In some embodiments, the database 104 is part of a cloud-based database system external to the system 100 and accessible by the server 102 over one or more additional networks. In some embodiments, all or part of the database 104 is locally stored on the server 102. In some embodiments, as described below, the database 104 electronically stores data on incidents, nodes (for example, pointers representing pieces of information related to the incidents), media assets (for example, audio or video clips related to the nodes), metadata (for example, describing characteristics of the nodes), and relationships (for example, between the nodes).

The display 106 is, for example, a liquid crystal display (LCD) touch screen, or an organic light-emitting diode (OLED) touch screen. In some embodiments, the display is integrated with the server 102. As described in detail below, the server 102 implements a graphical user interface (GUI) on the display, which interface enables a user to interact with the server 102. In some embodiments, the server 102 operates or is integrated with a head-mounted display (HMD), an optical head-mounted display (OHMD), or the display of a pair of smart glasses. In some embodiments, the display 106 is part of a computer terminal separate from the server 102 (for example, the computing device 112, described below), on which the server 102 presents the graphical user interface remotely, for example, via one or more additional networks.

In some embodiments, the server 102 operates using, among other things, augmented reality technology, where live images are displayed (for example, on the display 106) with text, graphics, or graphical user interface elements superimposed on or otherwise combined with the live images. In some embodiments, the server 102 operates using, among other things, virtual reality technology, where actual or simulated images are displayed (for example, on the display 106) with text, graphics, or graphical user interface elements superimposed on or otherwise combined with the images.

In some embodiments, the server 102, the database 104, and the display 106 are part of one or more of a computer-aided dispatch system, a records management system, a digital evidence management system, or a content management system (for example, the CommandCentral Vault™ by Motorola Solutions®) located at a public safety command center 108.

In some embodiments, the server 102 is communicatively coupled to a computing device 112 via a communications network 110. The communications network 110 is a communications network including wireless and wired connections. The communications network 110 may be implemented using a local area network, such as a Bluetooth™ network or Wi-Fi, a wide area network, such as the Internet, and other networks or combinations of networks including a Long Term Evolution (LTE) network, a Global System for Mobile Communications (or Groupe Spécial Mobile (GSM)) network, a Code Division Multiple Access (CDMA) network, an Evolution-Data Optimized (EV-DO) network, an Enhanced Data Rates for GSM Evolution (EDGE) network, a 3G network, and a 4G network. Derivatives of such networks and other suitable networks, including future-developed networks may also be used.

The computing device 112 is an electronic device for sending and receiving data to and from the server 102 (via the communications network 110), for example, a smart telephone, a tablet computer, a laptop computer, a smart watch, a body worn camera, and the like. In some embodiments, the computing device 112 captures images, video, audio, and other data related to incidents, and transmits such data to the server 102 for storage in the database 104.

FIG. 2 illustrates an example of the server 102. In the embodiment illustrated, the server 102 includes an electronic processor 205, a memory 210, and a communication interface 215. The illustrated components, along with other various modules and components are coupled to each other by or through one or more control or data buses that enable communication therebetween.

The electronic processor 205 obtains and provides information (for example, from the memory 210 and/or the communication interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, a clustering algorithm 230 and a Bayesian inference network 235. In some embodiments, the memory 210 stores and the electronic processor 205 executes multiple clustering algorithms and Bayesian networks. In some embodiments, the clustering algorithm is an unsupervised machine learning algorithm.

The communication interface 215 may include a wireless transmitter or transceiver for wirelessly communicating over the communications network 110. Alternatively or in addition to a wireless transmitter or transceiver, the communication interface 215 may include a port for receiving a cable, such as an Ethernet cable, for communicating over the communications network 110 or a dedicated wired connection. It should be understood that, in some embodiments, the server 102 communicates with the computing device 112 and other devices through one or more intermediary devices, such as routers, gateways, relays, and the like.

In some embodiments, the electronic processor 205 performs machine learning functions. Machine learning generally refers to the ability of a computer to learn a task or perform an analysis without being explicitly programmed to do so. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of these approaches, a computer program can ingest, parse, and understand data and progressively refine algorithms for data analytics.

As noted above, the server 102 receives and processes nodes and other data related to incidents. As described in detail below, the electronic processor 205 is configured to analyze and filter the nodes to enhance the investigation of incidents. As used herein, the term "incident" may refer to one or more related investigative efforts. In one example, an incident is a crime in progress, such as a bank robbery. In another example, an incident is something (for example, a crime) that occurred in the past. In other examples, an incident is the response to a call for service, for example, responding to a traffic accident, searching for a suspect, locating a missing person, responding to a fire, responding to a medical emergency, investigating a past incident, and the like.

Responding to or investigating an incident includes the detection, categorization, and analysis of information collected by responding personnel or gathered from other sources (for example, crime information or other government databases). In the examples described herein, each piece of information related to an incident is known as a "node." A node is any piece of information involved in or relevant to an investigation. Nodes may include, for example, people (for example, victims or suspects), vehicles, weapons, locations, buildings, or portions of buildings. Nodes may also be tangible things not commonly thought of as objects, but which are still relevant to the incident, for example, fluids leaked from automobiles, debris from damaged property, and blood. A node may also be a physical property or characteristic of another node (for example, a dent in an automobile, a graffiti tag on a building, or an article of clothing on a person). Nodes also include digital representations of data or documents related to the investigation, for example, police reports, search warrants, records of transactions, government documents, scanned papers, records of objects seized during a search, sounds, detectable smells (for example, of drugs, chemicals, or explosives), and the like.

Two types of nodes are used during the response to or investigation of incidents: outcome nodes and non-outcome nodes. Outcome nodes represent potential outcomes associated with an incident. One or more potential outcomes may be associated with an incident. In one example, an outcome node is a suspect related to the incident (for example, the person who robbed the bank). In another example, an outcome node is a premise (for example, where a person or object may be found, or an event may have taken place). In another example, an outcome node is a vehicle related to the incident (for example, a getaway car, or a vehicle involved in a hit and run). Any node that is not an outcome is a non-outcome node.

Nodes may share one or more dependent relationships with one another. Relationships may be directed (one node depends upon the other) or non-directed (the nodes depend upon one another). Nodes are related when they share a common characteristic. Nodes may also be related by virtue of being part of the same cluster, as described elsewhere herein. Non-outcome nodes may be related to one another. For example, a wheel may be related to a nearby vehicle, a group of persons may be related by their association with a criminal enterprise, and an article of clothing may be related to the wearer. Non-outcome nodes may also be related to outcome nodes. For example, a witness report regarding a bank robbery is a non-outcome node related to an outcome node (a suspect in the bank robbery). The relationships are included in the Bayesian inference network.

Figure 3:
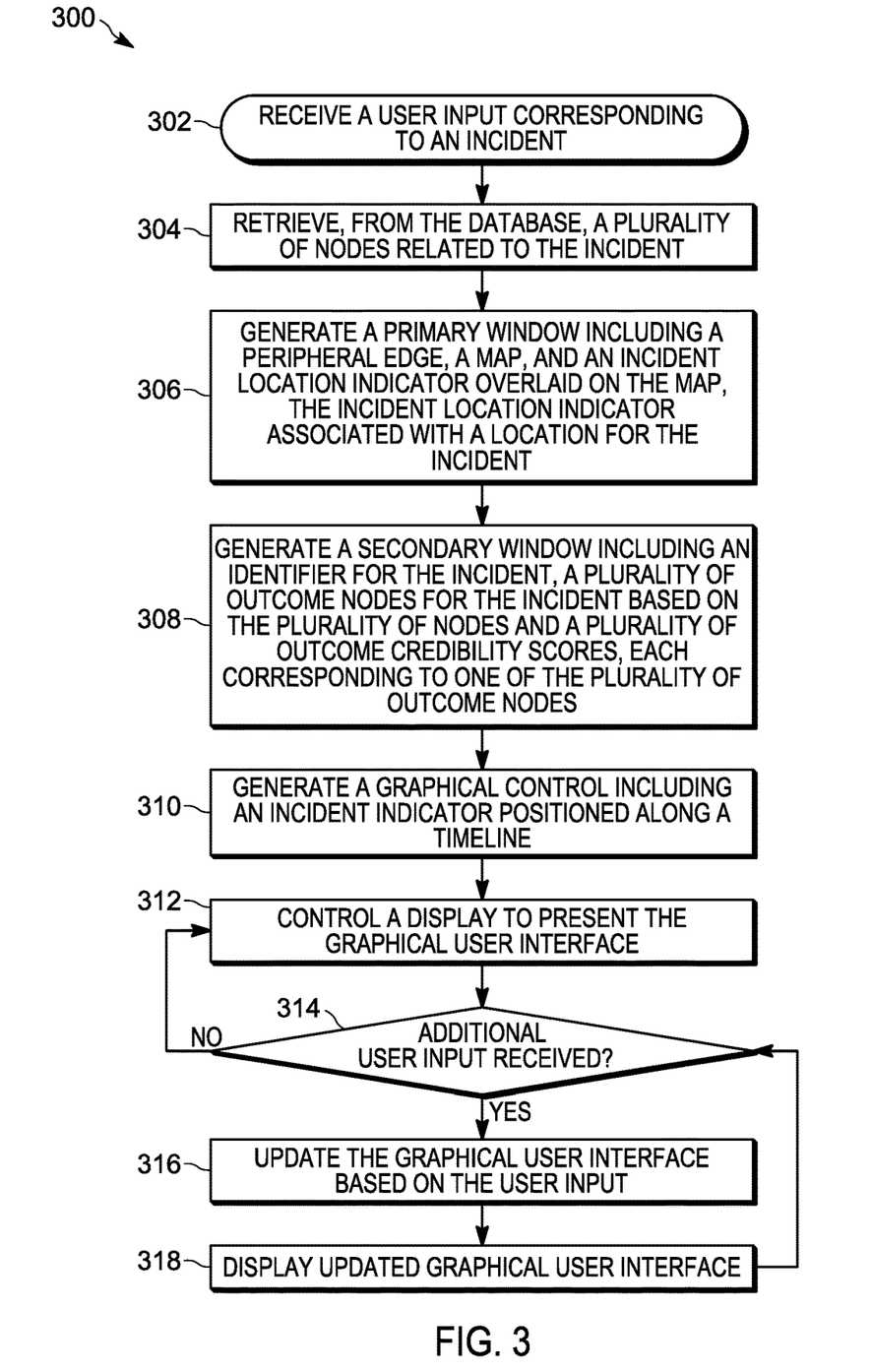
FIG. 3 is a flowchart of a method for geo-temporal incident navigation system in accordance with some embodiments.

Incidents may have many possible outcomes. Some nodes point toward one outcome (for example, an eye-witness report identifying a particular suspect), while other nodes point toward another outcome (for example, a video clip showing another suspect). Some nodes may point toward more than a single outcome (for example, a criminal record check showing both suspects have committed similar crimes in the past). Because incidents may involve a large amount of outcome nodes, non-outcome nodes, and relationships, making incident response or investigation time consuming and difficult, methods are provided herein to provide geo-temporal incident navigation with an integrated credibility assessment. For example, FIG. 3 illustrates an example method 300 for geo-temporal incident navigation. The method 300 is described as being performed by the server 102 and, in particular, the electronic processor 205. However, it should be understood that in some embodiments, portions of the method 300 are performed external to the server 102 by other devices, including for example, the computing device 112.

As an example, the method 300 is described in terms of the server 102 processing a plurality of nodes. In some embodiments, the plurality of nodes is retrieved from the database 104. In some embodiments, some of the plurality of nodes is received from the computing device 112, another source external to the server 102, or some combination of the foregoing. Regardless of the source, each of the nodes is associated with an incident, for example, the pursuit of a criminal suspect. The plurality of nodes may include both non-outcome and outcome nodes, as described above.

At block 302, the electronic processor 205 receives a user input corresponding to an incident (for example, stored in the database 104). In some embodiments, the electronic processor 205 receives the user input from a user operating the server 102 (for example, the entry of a unique identifier corresponding to an incident record in a computer-aided dispatch system, a records management system, a digital evidence management system, or a content management system).

At block 304, the electronic processor 205 retrieves, from the database, a plurality of nodes related to the incident. In some embodiments, the electronic processor 205 retrieves the nodes based on the unique identifier for the incident (received at block 302), which is stored in the nodes' metadata. The nodes may include non-outcome nodes and outcome nodes. In some embodiments, the electronic processor 205 also retrieves relationships for the nodes from the database 104.

In some embodiments, the electronic processor 205 also retrieves metadata associated with the nodes. Metadata corresponding to a node is data relating to or describing the node or the node's relationship to other nodes, or an aspect of the node that is relevant to the incident. Metadata may take a variety of forms and combinations. In some embodiments, metadata includes a timestamp for the node identifying when the node was first discovered by investigators, when the node was cataloged, and the like. In some embodiments, metadata includes a location for the node identifying where the node was located when it was first discovered by investigators, the current location of the node, and the like. Metadata also includes a node identifier, for example, a globally-unique identifier used to identify the node within the database 104. In other embodiments metadata includes some or combinations of metadata mentioned and other metadata including: an incident identifier that associates the node with an incident; a node type that characterizes the node (for example, person, automobile, weapon, document, and the like); an incident type that indicates the type of incident with which the node is associated (for example, a crime, a missing person, a traffic accident, and the like). In other embodiments, metadata includes a relationship to another node, for example, an automobile related to a registered owner record, or a weapon related to a body.

Metadata is entered in one or both of two ways. Metadata is entered by investigators collecting information, for example, via a police report. Metadata may also be collected automatically. In some embodiments, the electronic processor 205 retrieves metadata related to nodes from various government and public databases. For example, an identification number for a vehicle may be used to retrieve ownership information for the vehicle. In another example, financial information for a suspect may be used to retrieve data on recent transactions by that suspect from financial institution databases. In some embodiments, such retrieved data is used to create new nodes.

Figure 4:
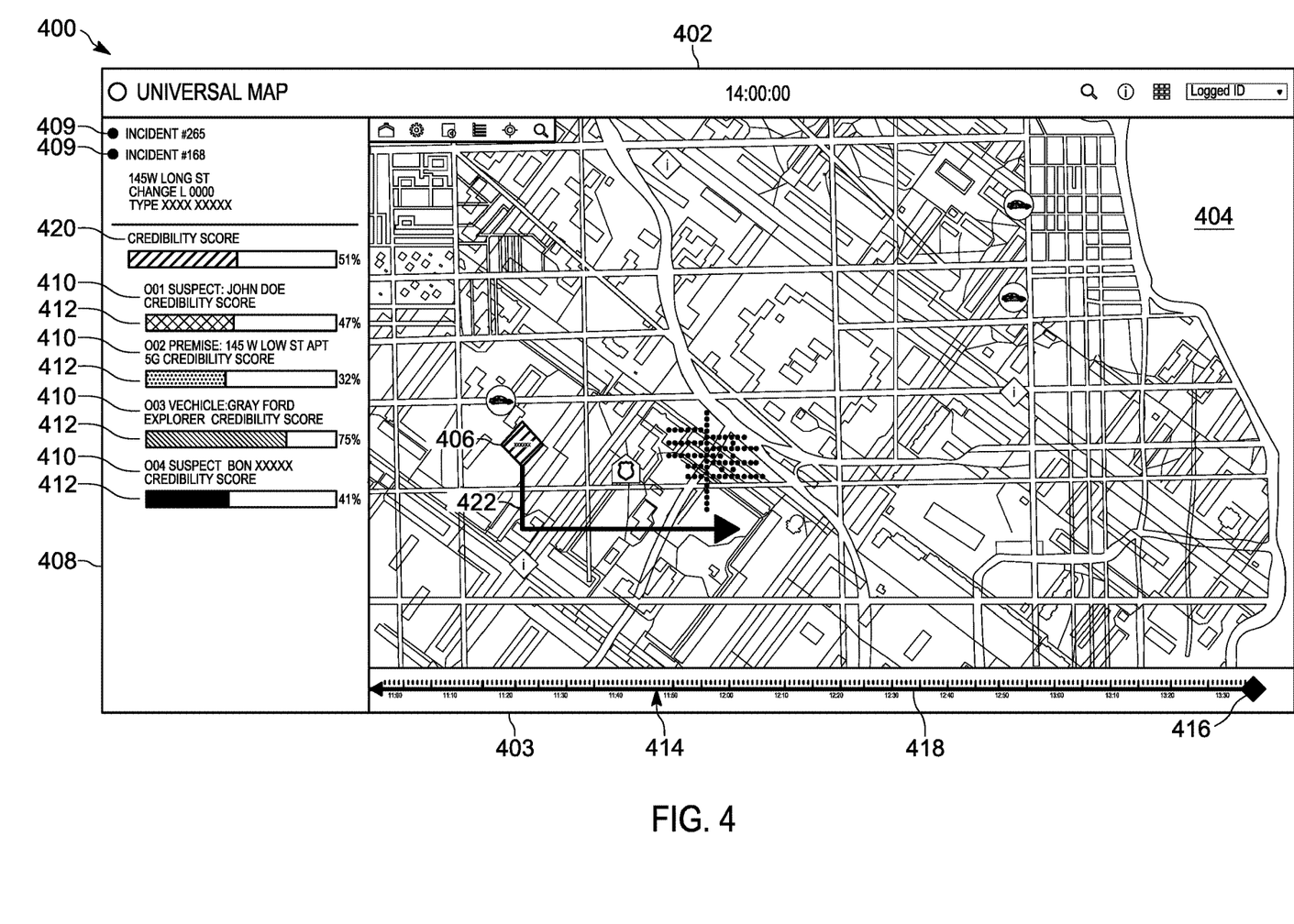
FIGS. 4 through 7 are example graphical user interfaces produced by the system of FIG. 1 in accordance with some embodiments.

After retrieving the plurality of nodes, the relationships, the metadata, or combinations of the foregoing, the electronic processor 205 uses the retrieved information to generate a graphical user interface. An example graphical user interface 400 is illustrated in FIG. 4.

At block 306, the electronic processor 205 generates a primary window 402. The primary window 402 includes a peripheral edge 403, a map 404, and an incident location indicator 406 overlaid on the map 404. The incident location indicator 406 is associated with a location for the incident. The incident location indicator 406 may be static or may relocate on the map 404 as the incident progresses (for example, in the event of a pursuit). The map 404 includes the area surrounding the current incident location.

At block 308, the electronic processor 205 generates a secondary window 408. The secondary window 408 includes an identifier 409 for the incident, a plurality of outcome nodes 410 for the incident based on the plurality of nodes (retrieved at block 304). Each outcome node 410 corresponds to a potential outcome for the incident. The secondary window 408 also includes a plurality of outcome credibility scores 412, each corresponding to one of the plurality of outcome nodes 410. A credibility score is a numerical indicator (for example, a percentage) of how likely it is that the potential outcome is the actual outcome for the incident. In some embodiments, a graphical visualization (for example, a progress bar) of the credibility score is displayed. For example, as illustrated in FIG. 4, it is 47% likely that John Doe is the suspect being pursued. As illustrated in FIG. 4, in some embodiments, identifiers 409 (each corresponding to a different incident) are listed in the secondary window 408. In such embodiments, a user of the graphical user interface 400 may select one of the incidents for display (for example, by clicking the identifier 409 corresponding to the desired incident).

Credibility scores for outcome nodes are determined based on the non-outcome nodes related to each outcome node. In some embodiments, clustering algorithms (for example, the clustering algorithm 230) are applied to the plurality of nodes (retrieved at block 304) to produce one or more clusters of nodes. In some embodiments, clusters result from nodes having metadata in common. Some nodes may be common to more than one cluster. In some embodiments, the creation of a cluster is not dependent on a single incident, but is based on the common features or properties of the data sources and clustering algorithms. A cluster may therefore contain nodes related to multiple incidents. The clusters are used to populate a Bayesian inference network (for example, the Bayesian network 235). The Bayesian inference network determines a credibility score at each of the outcome nodes, based on the cluster nodes. Nodes that tend to make the outcome more likely increase the credibility score for that outcome, whereas nodes that tend to make the outcome less likely decrease the credibility score. The credibility score may also be affected by how strongly the nodes are related. In some embodiments, credibility scores are determined dynamically over time and change based on the addition or subtraction of nodes and relationships from the clusters.

At block 310, the electronic processor 205 generates a graphical control 414. In some embodiments, the graphical control 414 is positioned at the peripheral edge 403 of the primary window 402. In some embodiments, the graphical control 414 is inset in the primary window 402, or is a free-floating control. The graphical control 414 includes an incident indicator 416 positioned along a timeline 418. The incident indicator 416 is associated with the identifier for the incident. The plurality of outcome nodes 410 and the plurality of credibility scores 412 are selected based on the position of the incident indicator 416 on the timeline 418. In some embodiments, the position of the incident indicator 416 on the timeline 418 is used to select a span of time (for example, between the incident indicator 416 and the starting time of the incident). In some embodiments, the position of the incident indicator 416 on the timeline 418 is synchronized with the location of the incident location indicator 406 on the map 404, such that repositioning one repositions the other accordingly.

Some of the plurality of outcome nodes 410 may not exist at some points along the timeline. For example, a new suspect may be reported to a police officer thirty minutes into an incident response, and would not be presented prior to that time. As noted above, credibility scores may be dynamically calculated and may thus vary with time. In some embodiments, the electronic processor 205 updates the incident location indicator 406, the plurality of outcome nodes 410, and the plurality of credibility scores 412 based on a second position of the incident indicator 416 on the timeline 418. For example, the Bayesian inference network 235 recomputes the outcome nodes 410 and the credibility scores 412 based on the information available at the point in time represented by the second position of the incident indicator 416. In one example, position of the incident indicator 416 on the timeline 418 is continuously adjusted with the passage of time such that the position of the incident indicator 416 at any point is based on the current time.

The graphical control 414, as illustrated in FIG. 4, is a slider control. In other embodiments, other configurations of the graphical control 414 are used (for example, a scroll bar, a wheel, a spinner, or another suitable graphical control).

In the example provided, the electronic processor 205 generates and displays an overall incident credibility score 420 for the incident itself. In some embodiments, the overall incident credibility score 420 is an average of the outcome credibility scores. In other embodiments, the overall incident credibility score 420 is a weighted average of the outcome credibility scores (for example, using weights set by a public safety agency). The overall incident credibility score 420 provides a comparative tool that, for example, public safety personnel use to compare multiple ongoing incidents. In some embodiments, the overall incident credibility score 420 is continuously updated as the outcome nodes and associated credibility scores for the incident change over time, whether through the passage of real time, or the selection of a particular past point or range in time, as described elsewhere herein.

In some embodiments, the electronic processor 205 generates and displays a pursuit route 422. The pursuit route 422 is generated based on the location of the incidents, where the incident location changes over time (for example, the pursuit of a suspect). In some embodiments, the pursuit route 422 is generated based on the incident location indicator 406 and the position of the incident indicator 416 on the timeline 418. For example, as illustrated in FIG. 4, the pursuit route 422 shows the route taken by the suspect being pursued, from the start of the timeline 418 to the time represented by the current position of the incident indicator 416.

At block 312, the electronic processor 205 controls the display 106 to present the graphical user interface (generated at blocks 306, 308, 310). In some embodiments, the electronic processor 205 controls the display 106 directly. In other embodiments, the electronic processor 205 sends information and instructions to a remote device (for example, the computing device 112), which controls a display to present the graphical user interface 400.

When the graphical user interface 400 has been generated and displayed for a user, the user may interact with the graphical user interface 400 (for example, by manipulating the graphical control 414). At block 314, the electronic processor 205 monitors for user inputs which request changes to the graphical user interface 400. If no such user inputs are received, the electronic processor 205 continues to present the graphical user interface 400, at block 312. When a user input requesting a change is received (at block 314), the electronic processor 205 updates the graphical user interface 400 based on the user input, at block 316.

Figure 5:
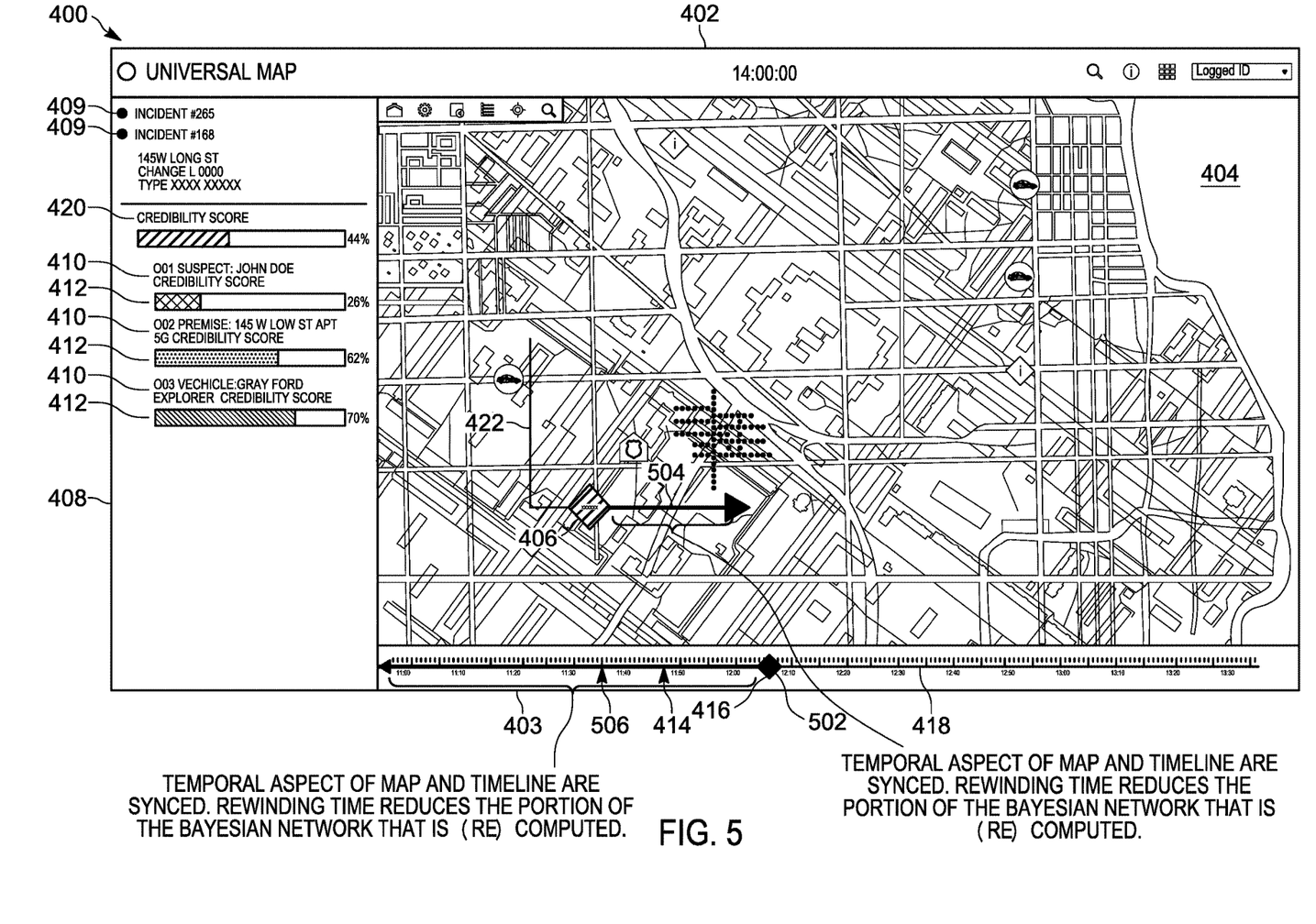

In some embodiments, the electronic processor 205 receives a user input indicative of a past point in time during the incident. For example, a user may drag the incident indicator 416 to a position on the timeline 418. In another example, a user may click, double click, or otherwise indicate a position on the timeline 418 for the incident indicator 416. In such embodiments, the electronic processor 205 updates the incident location indicator 406, the plurality of outcome nodes 410, the plurality of credibility scores 412, and the overall credibility score 420 based on the new position of the incident indicator 416 on the timeline 418. In some embodiments, a user may drag or otherwise position the incident location indicator 406 on the map 404, selecting a point in time. In such embodiments, the incident indicator 416 and the other elements noted above are updated based on the position the incident location indicator 406. In one example, as illustrated in FIG. 5, the electronic processor 205 has received a user input moving the incident indicator 416 to a position 502 on the timeline 418, which represents an earlier time in the incident. In response, fewer outcome nodes 410 are listed in the secondary window 408 and the corresponding credibility scores 412 have also been adjusted. The example illustrated includes a pursuit route 422. Thus, also in response to the user input, the incident location indicator 406 has been moved to a different point along the pursuit route 422. In addition, a portion 504 of the pursuit route has been highlighted to match the highlighted portion 506 of the timeline 418, representing the time since the incident began to the time indicated by the position 502. In some embodiments, the overall pursuit route 422 is highlighted, and changing the position of the incident indicator 416 causes only a portion (for example, the portion 504) of the pursuit route 422 to be highlighted. In some embodiments, the electronic processor 205 receives user input moving incident location indicator 406 to a different point along the pursuit route 422, which represents an earlier time in the incident, and adjusts the incident indicator 416 to a position 502 on the timeline 418 corresponding to the new location for the incident location indicator 406.

Figure 6:
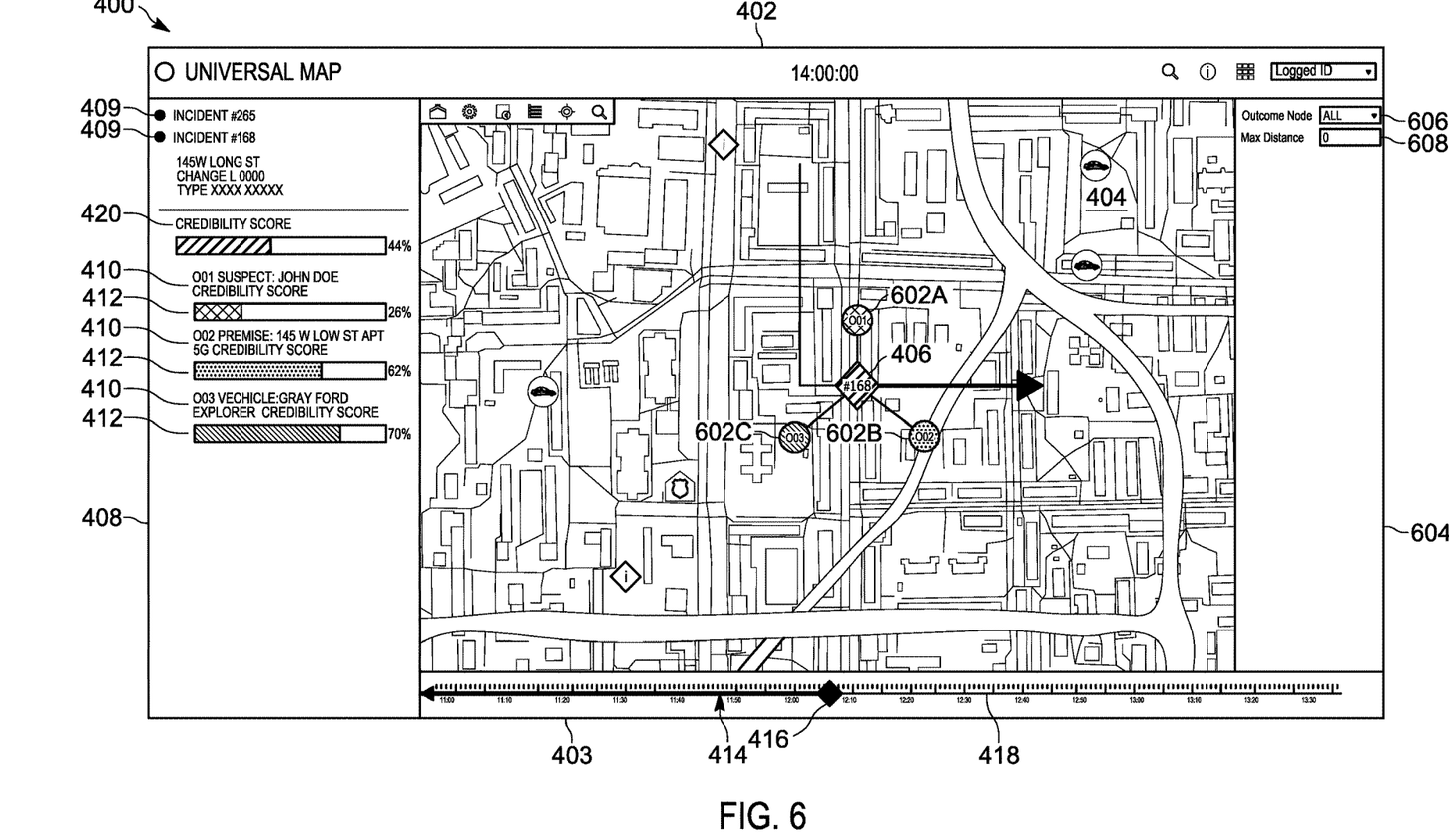

In some embodiments, the electronic processor 205 receives a user input selecting the incident location indicator 406. In response to receiving the user input, as illustrated in FIG. 6, the electronic processor 205 updates the primary window 402 of the graphical user interface 400 to include a plurality of outcome node indicators 602A, 602B, 602C overlaid on the map 404. Each of the outcome node indicators 602A, 602B, 602C corresponds to one of the plurality of outcome nodes 410. This graphically presents which outcome nodes are related to the incident selected by the user input. In some embodiments, the graphical user interface 400 displays more than one incident in the primary window 402. In such embodiments, selecting one incident location indicator generates outcome node indicators for that incident, while hiding the outcome node indicators for the other incidents. In some embodiments, the electronic processor 205 updates the map 404 to highlight the plurality of outcome node indicators 602A, 602B, 602C and the incident location indicator 406. For example, the electronic processor 205 darkens or fades the map 404, such that the contents are still visible, though not as visually dominant.

The electronic processor 205 also generates a tertiary window 604. The tertiary window 604 includes a graphical control 606 for selecting one or more of the plurality of outcome nodes 412, and a graphical control 608 for selecting a maximum node distance (described in detail below).

In some embodiments, the electronic processor 205 receives a user input selecting one of the plurality of outcomes (for example, from a user manipulating the graphical control 606). In some embodiments, the electronic processor 205 receives a user input selecting one of the plurality of outcomes from a user clicking, double clicking, or otherwise selecting one of the plurality of outcome node indicators 602A, 602B, 602C. In response to receiving the user input selecting one of the plurality of outcomes, the electronic processor 205 updates the graphical user interface 400 based on the selected outcome.

Figure 7:
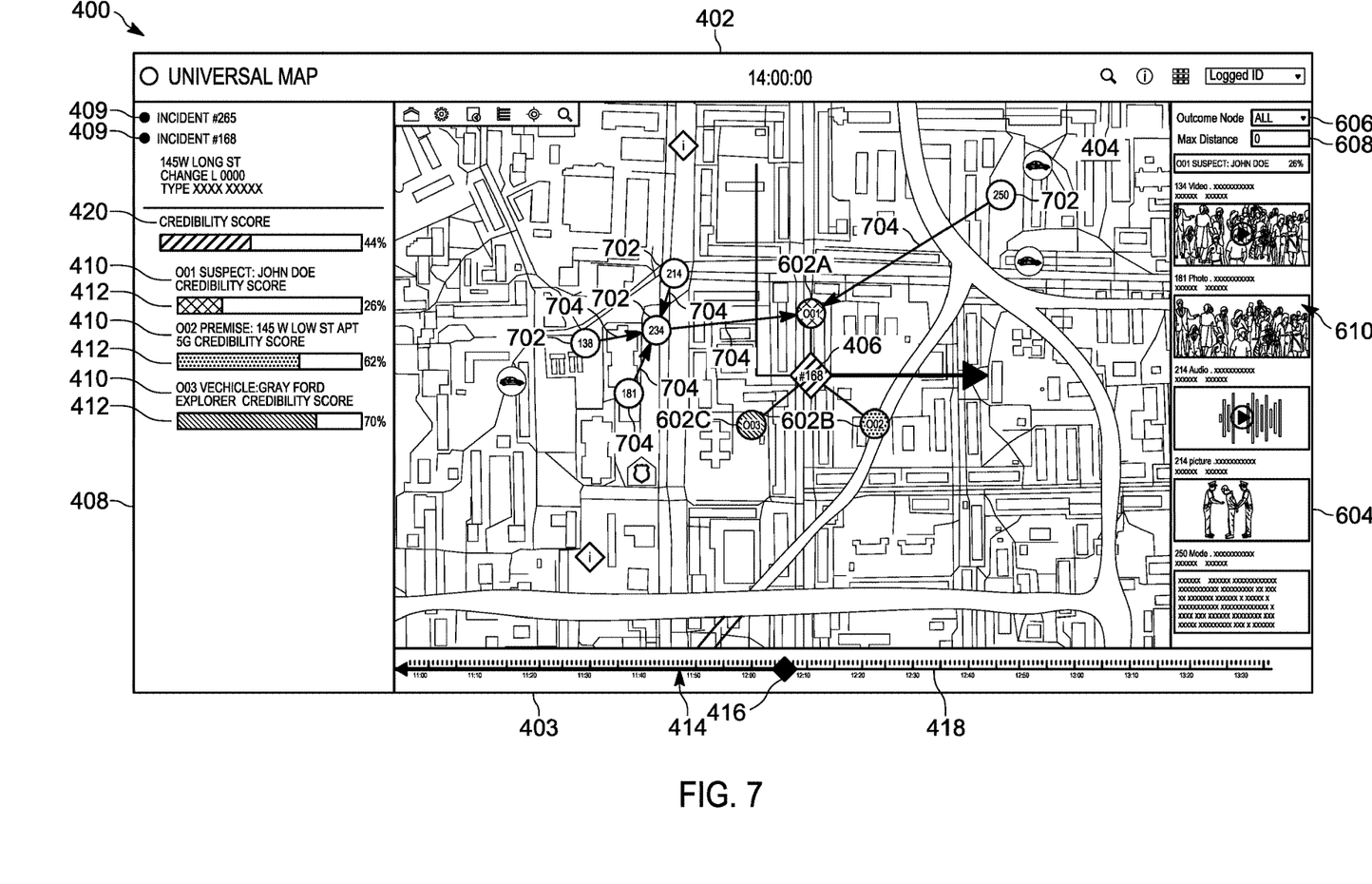

As illustrated in example provided in FIG. 7, the electronic processor 205 generates, in the primary window 402, a plurality of non-outcome node indicators 702 overlaid on the map 404. The plurality of non-outcome node indicators 702 corresponds to a subset of the plurality of nodes (retrieved at block 304). The subset is based on one or both of the selected outcome (for example, the subset includes the nodes that are related to the outcome) and the distance (subject to a maximum node distance (described in detail below)). In some embodiments, the subset of nodes is or is selected from the cluster of nodes related to the outcome, as described herein.

The electronic processor 205 also generates, in the primary window 402, a plurality of node connectors 704 overlaid on the map 404. Each of the plurality of node connectors 704 corresponds to a relationship between one of the plurality of nodes and another of the plurality of nodes, or the selected outcome. The node connectors 704 graphically represent edges (for example, as used in a knowledge graph) between non-outcome node indicators 702 or outcome node indicators 602A, 602B, 602C. As illustrated in FIG. 7, in some embodiments, a node connector 704 is represented by an arrow pointing from one node to another related node, which represents a directed relationship. An undirected relationship is represented by a node connector 704 in the form of a line with no arrowheads.

The electronic processor 205 also generates, in the tertiary window 604, a plurality of media assets 610. The media assets 610 are video files, audio files, notes, reports, and the like, which are associated with the plurality of non-outcome node indicators 702. In some embodiments, the electronic processor 205 presents the media assets using thumbnail previews (which allow a user to play the asset or select an asset for viewing in a larger format) in a list format. In some embodiments, the electronic processor 205 includes node-related metadata in the tertiary window 604, either attached to or apart from the media assets 610.

In some embodiments, the subset of nodes, as well as the corresponding relationships, media assets, and metadata, are limited by a maximum node distance value. In one embodiment, the electronic processor 205 receives a user input selecting the maximum node distance (for example, using the graphical control 608). The maximum node distance represents the maximum allowable number of links (edges) in a chain (or graph) of nodes related to the selected outcome. For example, as illustrated in FIG. 7, the graphical control 608 is set to two. As a consequence, the maximum distance between the outcome node indicator 602A and any of the non-outcome node indicators 702 is two. In response to receiving the user input, the electronic processor 205 updates the plurality of non-outcome node indicators based on the maximum node distance. For example, any of the plurality of non-outcome node indicators exceeding the maximum node distance is hidden from the display. In another example, additional non-outcome node indicators may be presented when the maximum node distance is increased. The electronic processor 205 then updates the plurality of node connectors, the plurality of media assets, and the node-related metadata based on the updated plurality of non-outcome node indicators.

Returning to FIG. 3, regardless of how the graphical user interface 400 has been updated based on user input, the electronic processor 205 controls the display 106 to present the updated graphical user interface, at block 318.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A geo-temporal incident navigation system comprising:
a database;
a display; and
an electronic processor communicatively coupled to the database and the display, and configured to
receive a user input corresponding to a past incident;
retrieve, from the database, a plurality of nodes related to the past incident;
generate a graphical user interface including
a primary window including a peripheral edge, a map, and an incident location indicator overlaid on the map, the incident location indicator associated with a location for the past incident,
a secondary window including an identifier for the past incident, a plurality of outcome nodes for the past incident based on the plurality of nodes, each outcome node corresponding to a potential outcome for the past incident, and a plurality of outcome credibility scores, each corresponding to one of the plurality of outcome nodes, and each indicating a likelihood that the corresponding potential outcome is an actual outcome for the past incident, and a graphical control including an incident indicator positioned along a timeline, the graphical control positioned at the peripheral edge of the primary window,
wherein the incident indicator is associated with the identifier for the past incident, and wherein the plurality of outcome nodes is selected based on a position of the incident indicator on the timeline and the plurality of credibility scores is computed based on a position of the incident indicator on the timeline; and
control the display to present the graphical user interface.

2. The geo-temporal incident navigation system of claim 1, wherein the electronic processor is further configured to determine a second position of the incident indicator on the timeline; and
update the incident location indicator, the plurality of outcome nodes, and the plurality of credibility scores based on the second position of the incident indicator on the timeline.

3. The geo-temporal incident navigation system of claim 2, wherein the electronic processor is further configured to determine a second position of the incident indicator on the timeline by adjusting the position of the incident indicator on the timeline based on the current time.

4. The geo-temporal incident navigation system of claim 2, wherein the electronic processor is further configured to determine a second position of the incident indicator on the timeline by
receiving a second user input indicative of a point in time during the past incident; and
adjusting the position of the incident indicator on the timeline based on the user input.

5. The geo-temporal incident navigation system of claim 1, wherein the electronic processor is further configured to receive a second user input selecting the incident location indicator; and
in response to receiving the second user input,
update the graphical user interface to include
in the primary window, a plurality of outcome node indicators overlaid on the map, each corresponding to one of the plurality of outcome nodes, and
a tertiary window including a second graphical control for selecting one or more of the plurality of outcome nodes, and
control the display to present the updated graphical user interface.

6. The geo-temporal incident navigation system of claim 5, wherein the electronic processor is further configured to receive a third user input selecting one of the plurality of outcomes; and
in response to receiving the third user input,
update the graphical user interface to include
in the primary window,
a plurality of non-outcome node indicators overlaid on the map, the plurality of non-outcome node indicators corresponding to a subset of the plurality of nodes related to the past incident, the subset based on the selected outcome, and
a plurality of node connectors overlaid on the map, each of the plurality of node connectors corresponding to a relationship between one of the plurality of nodes and one selected from the group consisting of another of the plurality of nodes and the selected outcome, in the tertiary window, a plurality of media assets based on the subset, and node-related metadata based on the subset, and
control the display to present the updated graphical user interface.

7. The geo-temporal incident navigation system of claim 6, wherein the subset is selected from a cluster of nodes related to the selected outcome.

8. The geo-temporal incident navigation system of claim 6, wherein the electronic processor is further configured to
receive a fourth user input selecting a maximum node distance; and
in response to receiving the fourth user input,
update the plurality of non-outcome node indicators based on the maximum node distance,
update the plurality of node connectors based on the updated plurality of non-outcome node indicators,
update the plurality of media assets based on the updated plurality of non-outcome node indicators,
update the node-related metadata based on the updated plurality of non-outcome node indicators,
update the graphical user interface to include,
in the primary window, the updated plurality of non-outcome node indicators and the updated plurality of node connectors, and
in the tertiary window, the updated plurality of media assets and the updated node-related metadata, and
control the display to present the updated graphical user interface.

9. The geo-temporal incident navigation system of claim 1, wherein the secondary window further includes an incident credibility score corresponding to the past incident itself.

10. The geo-temporal incident navigation system of claim 1, wherein the primary window further includes a pursuit route based on the incident location indicator and the position of the incident indicator on the timeline.

11. A method for geo-temporal incident navigation, the method comprising:
receiving, with an electronic processor, a user input corresponding to a past incident;
retrieving, from a database communicatively coupled to the electronic processor, a plurality of nodes related to the past incident;
generating, with the electronic processor, a graphical user interface including
a primary window including a peripheral edge, a map, and an incident location indicator overlaid on the map, the incident location indicator associated with a location for the past incident,
a secondary window including an identifier for the past incident, a plurality of outcome nodes for the past incident based on the plurality of nodes, each outcome node corresponding to a potential outcome for the past incident, and a plurality of outcome credibility scores, each corresponding to one of the plurality of outcome nodes, and each indicating a likelihood that the corresponding potential outcome is an actual outcome for the past incident, and
a graphical control including an incident indicator associated with the identifier for the past incident and positioned along a timeline, the graphical control positioned at the peripheral edge of the primary window,
wherein the plurality of outcome nodes is selected based on a position of the incident indicator on the timeline and the plurality of credibility scores is computed based on a position of the incident indicator on the timeline; and
controlling, with the electronic processor, a display to present the graphical user interface.

12. The method for geo-temporal incident navigation of claim 11, further comprising:
determining a second position of the incident indicator on the timeline; and
updating the incident location indicator, the plurality of outcome nodes, and the plurality of credibility scores based on the second position of the incident indicator on the timeline.

13. The method for geo-temporal incident navigation of claim 12, wherein determining a second position of the incident indicator on the timeline includes adjusting the position of the incident indicator on the timeline based on the current time.

14. The method for geo-temporal incident navigation of claim 12, wherein determining a second position of the incident indicator on the timeline includes
receiving a second user input indicative of a point in time during the past incident; and
adjusting the position of the incident indicator on the timeline based on the user input.

15. The method for geo-temporal incident navigation of claim 14, further comprising:
receiving a second user input selecting the incident location indicator; and
in response to receiving the second user input,
updating the graphical user interface to include
in the primary window, a plurality of outcome node indicators overlaid on the map, each corresponding to one of the plurality of outcome nodes, and
a tertiary window including a second graphical control for selecting one or more of the plurality of outcome nodes, and
controlling the display to present the updated graphical user interface.

16. The method for geo-temporal incident navigation of claim 15, further comprising:
receive a third user input selecting one of the plurality of outcomes; and
in response to receiving the third user input,
updating the graphical user interface to include
in the primary window,
a plurality of non-outcome node indicators overlaid on the map, the plurality of non-outcome node indicators corresponding to a subset of the plurality of nodes related to the past incident, the subset based on the selected outcome, and
a plurality of node connectors overlaid on the map, each of the plurality of node connectors corresponding to a relationship between one of the plurality of nodes and one selected from the group consisting of another of the plurality of nodes and the selected outcome,
in the tertiary window,
a plurality of media assets based on the subset, and node-related metadata based on the subset, and
controlling the display to present the updated graphical user interface.

17. The method for geo-temporal incident navigation of claim 16, wherein updating the graphical user interface to include a plurality of non-outcome node indicators corresponding to a subset includes selecting the subset from a cluster of nodes related to the selected outcome.

18. The method for geo-temporal incident navigation of claim 16, further comprising:
- receiving a fourth user input selecting a maximum node distance; and
- in response to receiving the fourth user input,
  - updating the plurality of non-outcome node indicators based on the maximum node distance,
  - updating the plurality of node connectors based on the updated plurality of non-outcome node indicators,
  - updating the plurality of media assets based on the updated plurality of non-outcome node indicators,
  - updating the node-related metadata based on the updated plurality of non-outcome node indicators,
  - updating the graphical user interface to include,
    - in the primary window, the updated plurality of non-outcome node indicators and the updated plurality of node connectors, and
    - in the tertiary window, the updated plurality of media assets and the updated node-related metadata, and
  - controlling the display to present the updated graphical user interface.

19. The method for geo-temporal incident navigation of claim 11, wherein generating a graphical user interface including a secondary window includes generating, in the secondary window, an incident credibility score corresponding to the past incident itself.

20. The method for geo-temporal incident navigation of claim 11, wherein generating a graphical user interface including a primary window includes generating, in the primary window, a pursuit route based on the incident location indicator and the position of the incident indicator on the timeline.

* * * * *